(12) United States Patent
Kang et al.

(10) Patent No.: US 9,511,976 B2
(45) Date of Patent: Dec. 6, 2016

(54) POSITION FEEDBACK FOR ELEVATOR SYSTEM

(75) Inventors: Keunmo Kang, South Windsor, CT (US); Timothy D. Devalve, Manchester, CT (US); William A. Veronesi, Hartford, CT (US); Slade R. Culp, Coventry, CT (US); Harold Terry, Avon, CT (US); Daryl J. Marvin, Farmington, CT (US); Ismail Agirman, Southington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 515 days.

(21) Appl. No.: 14/002,387

(22) PCT Filed: Mar. 31, 2011

(86) PCT No.: PCT/US2011/030754
§ 371 (c)(1),
(2), (4) Date: Aug. 30, 2013

(87) PCT Pub. No.: WO2012/134482
PCT Pub. Date: Oct. 4, 2012

(65) Prior Publication Data
US 2014/0014441 A1 Jan. 16, 2014

(51) Int. Cl.
*B66B 1/34* (2006.01)
*G01B 11/00* (2006.01)
(Continued)

(52) U.S. Cl.
CPC ............... *B66B 1/34* (2013.01); *B66B 1/3492* (2013.01); *G01B 11/00* (2013.01); *G01B 11/26* (2013.01);
(Continued)

(58) Field of Classification Search
CPC ......... B66B 1/34; B66B 1/3492; G01B 11/00; G01B 11/26; G01B 11/30; G01B 21/00; G01B 21/22
(Continued)

(56) References Cited

U.S. PATENT DOCUMENTS 4,195,291 A 3/1980 Burks, Jr.
4,750,592 A 6/1988 Watt
(Continued)

FOREIGN PATENT DOCUMENTS

DE 101 41 412 A1 3/2003
JP 2005 289627 A 10/2005
JP 2005289627 A 10/2005

OTHER PUBLICATIONS

Search report for related European Application No. 11862159.8; report dated Oct. 24, 2014.
(Continued)

*Primary Examiner* — Anthony Salata
(74) *Attorney, Agent, or Firm* — Cantor Colburn LLP

(57) ABSTRACT

A feedback system for a motor of an elevator system is provided. The feedback system may include a first sensor and a processing circuit. The first sensor may be disposed in proximity to a drive component of the elevator system and configured to detect a change in position of the drive component. The processing circuit may be configured to receive a first data signal from the first sensor corresponding to the change in position of the drive component and generate a feedback signal for controlling the motor based on the first data signal.

16 Claims, 3 Drawing Sheets

(51) Int. Cl.
*G01B 11/26* (2006.01)
*G01B 21/00* (2006.01)
*G01B 21/22* (2006.01)
*G01B 11/30* (2006.01)

(52) U.S. Cl.
CPC .............. *G01B 11/30* (2013.01); *G01B 21/00* (2013.01); *G01B 21/22* (2013.01)

(58) Field of Classification Search
USPC ................................ 187/247, 391, 393, 394
See application file for complete search history.

(56) References Cited

U.S. PATENT DOCUMENTS

| | | | |
|---|---|---|---|
| 4,774,463 A | | 9/1988 | Mizobuchi et al. |
| 4,968,145 A | | 11/1990 | Takiguchi |
| 4,987,299 A | | 1/1991 | Kobayashi et al. |
| 5,349,854 A | * | 9/1994 | Garrido ................. B66B 1/3492 187/394 |
| 5,746,452 A | | 5/1998 | El-Ibiary et al. |
| 5,886,308 A | * | 3/1999 | Ericson ..................... B66B 7/10 187/391 |
| 6,057,976 A | | 5/2000 | Ishida et al. |
| 6,073,728 A | * | 6/2000 | Olsen ..................... B66B 7/123 187/250 |
| 6,328,136 B1 | * | 12/2001 | Tauchi ................. B66B 1/3492 187/391 |
| 6,564,635 B2 | | 5/2003 | Sherman et al. |
| 6,713,981 B2 | * | 3/2004 | Nakajima ................ H02P 6/16 310/156.05 |
| 7,054,783 B2 | | 5/2006 | Morishita |
| 7,117,981 B2 | * | 10/2006 | Logan ................... B66B 7/1238 187/281 |
| 7,202,979 B2 | | 4/2007 | Takamiya et al. |
| 7,540,357 B2 | * | 6/2009 | Finn ....................... B66B 1/3492 187/394 |
| 7,600,443 B2 | | 10/2009 | Ott |
| 7,688,216 B2 | | 3/2010 | Mizutani et al. |
| 7,857,106 B2 | * | 12/2010 | Zapf ....................... B66B 7/062 187/394 |
| 7,938,233 B2 | * | 5/2011 | Kunz ..................... B66B 1/3492 187/394 |
| 8,360,211 B2 | * | 1/2013 | Korhonen ............ H02K 11/215 187/289 |
| 2007/0159618 A1 | | 7/2007 | Woolfson et al. |
| 2014/0246275 A1 | * | 9/2014 | Korvenranta ....... B66B 11/0476 187/254 |

OTHER PUBLICATIONS

International Search Report and Written Opinion for related International Application No. PCT/US11/30754; report dated Dec. 21, 2011.

* cited by examiner

POSITION FEEDBACK FOR ELEVATOR SYSTEM

CROSS-REFERENCE TO RELATED APPLICATIONS

This application is a U.S. national stage filing under U.S.C. 0371 of International Patent Application No. PCT/US11/30754, filed on Mar. 31, 2011.

FIELD OF THE DISCLOSURE

The present disclosure generally relates to motor controls, and more particularly, to systems and methods for controlling a motor of an elevator system.

BACKGROUND OF THE DISCLOSURE

Feedback systems for elevators are used to track the position or speed of an elevator cab as it is moved along an elevator hoistway. More specifically, elevators employ encoders that are configured to monitor the rotational displacement and/or speed of a traction motor that may be driving the elevator cab through the hoistway. Using known mechanical relationships between the traction motor, traction sheaves, tension members and the hoistway, the data provided by the encoder can then be used to determine the position and/or speed of the elevator cab with respect to the hoistway.

Although encoders may prove to be an adequate solution for monitoring elevator control, the costs of encoders and implementations thereof have led to increased efforts in developing comparable encoderless solutions for providing efficient feedback of elevator control. However, existing encoderless implementations can be excessively complex in design and impractical. Existing encoderless applications can also have noise, reliability and inefficiency (especially at low elevator cab speeds) issues.

Accordingly, there is a need for systems and methods which provide encoderless and cost-effective means for controlling an elevator with suitable reliability and performance. Moreover, there is a need for relatively quiet systems and methods capable of providing consistent feedback for elevator controls throughout the entire range of operational speeds of an elevator.

SUMMARY OF THE DISCLOSURE

In accordance with one aspect of the disclosure, a feedback system for a motor of an elevator system is provided. The feedback system may include a first sensor and a processing circuit. The first sensor may be positioned in proximity to a drive component of the elevator system and configured to detect a change in position of the drive component. The processing circuit may be configured to receive a first data signal from the first sensor corresponding to the change in position of the drive component and generate a feedback signal for controlling the motor based on the first data signal.

Additionally or alternatively, the processing circuit may be configured to determine at least one of an angular displacement and an angular speed of a rotor relative to the motor based on the first data signal.

In another refinement, the first sensor may include a transmitter for emitting a sensor signal and a receiver for receiving a reflection of the sensor signal. The emitted sensor signal may include a predetermined frequency.

In a related refinement, the processing circuit may be configured to detect any shift in frequency between the sensor signal emitted and the reflected sensor signal received by the first sensor, and determine one or more of angular displacement and angular speed of a rotor relative to the motor based on the shift in frequency.

In another refinement, the first sensor may be configured to detect the change in position of the drive component based on surface irregularities of the drive component.

In another refinement, the first sensor may include at least one of a laser source, a light-emitting diode LED source, an infrared light source, an ultrasonic wave source, and a microwave source.

In another refinement, the drive component may include at least one or more of a tension member, a traction sheave and a rotor rotatably coupled to the motor of the elevator system.

In yet another refinement, the processing circuit may be configured to receive a second data signal from a second sensor and generate a feedback signal based on the first and second data signals.

In a related refinement, the first data signal may correspond to a change in position of a traction sheave and the second data signal may correspond to a change in position of a tension member. The processing circuit may further be configured to determine a state of traction between the tension member and the traction sheave based on any discrepancies between the first and second data signals.

In accordance with another aspect of the disclosure, a feedback system for controlling a motor of an elevator system is provided. The feedback system may include a first sensor, a second sensor, a processing circuit and a controller. The first sensor may be positioned in proximity to a rotor rotatably coupled to the motor and configured to output a first data signal corresponding to a change in position of the rotor. The second sensor may be positioned in proximity to a tension member of the elevator system and configured to output a second data signal corresponding to a change in position of the tension member. The processing circuit may be configured to receive the first and second data signals from the first and second sensors, determine at least an angular displacement of the rotor relative to the motor based on the first and second data signals, and generate a feedback signal based on the angular displacement of the rotor. The controller may be configured to receive the feedback signal and generate a drive signal for driving the motor based on the feedback signal.

Additionally or alternatively, the processing circuit may be configured to further determine one or more of position and speed of an elevator cab based on the speed of the rotor.

In another refinement, each of the first and second sensors may include a transmitter for emitting a sensor signal of a predetermined frequency and a receiver for receiving a reflection of the sensor signal. The sensor signals may be reflected off of the rotor and the tension member.

In a related refinement, the processing circuit may be configured to detect any shifts in frequency in the reflected sensor signal for each of the first and second sensors. The processing circuit may be configured to determine the angular speed of the rotor based on the shifts in frequency.

In another refinement, each of the first and second sensors may include at least one of a laser source, a light-emitting diode LED source, an infrared light source, an ultrasonic wave source, and a microwave source.

In another refinement, the rotor may be rigidly coupled to a traction sheave, and the processing circuit may be configured to determine a state of traction between the tension member and the traction sheave based on any discrepancies between the first and second data signals.

In yet another refinement, a surface of the rotor may be provided with one or more markings and the first sensor may include a camera configured to visually capture at least a portion of the markings. The processing circuit may be configured to determine a current angular displacement of the rotor based on a pattern of the markings that are captured by the camera.

In accordance with yet another aspect of the disclosure, a method for controlling a motor of an elevator system having an elevator cab is provided. The method may provide a first sensor in close proximity to a first drive component of the elevator system, wherein the first sensor may be configured to generate a first data signal in response to a change in position of the first drive component. The method may also determine at least a change in position of the elevator cab based on the change in position of the first drive component, and generate a feedback signal for driving the motor of the elevator system. The feedback signal may be based at least partially on the changes in position of the first drive component and the elevator cab.

Additionally or alternatively, the first data signal may correspond to a frequency shift between an emitted sensor signal and a reflected sensor signal. The reflected sensor signal may be reflected off of a surface of the first drive component.

In another refinement, the first sensor may include at least one of a laser source, a light-emitting diode LED source, an infrared light source, an ultrasonic wave source, and a microwave source.

In yet another refinement, the method may further provide a second sensor in close proximity to a second drive component of the elevator system. The second sensor may be configured to generate a second data signal in response to a change in position of the second drive component, and determine a state of traction between the first and second drive components based on any discrepancies between the first and second data signals.

These and other aspects of this disclosure will become more readily apparent upon reading the following detailed description when taken in conjunction with the accompanying drawings.

Figure 1:
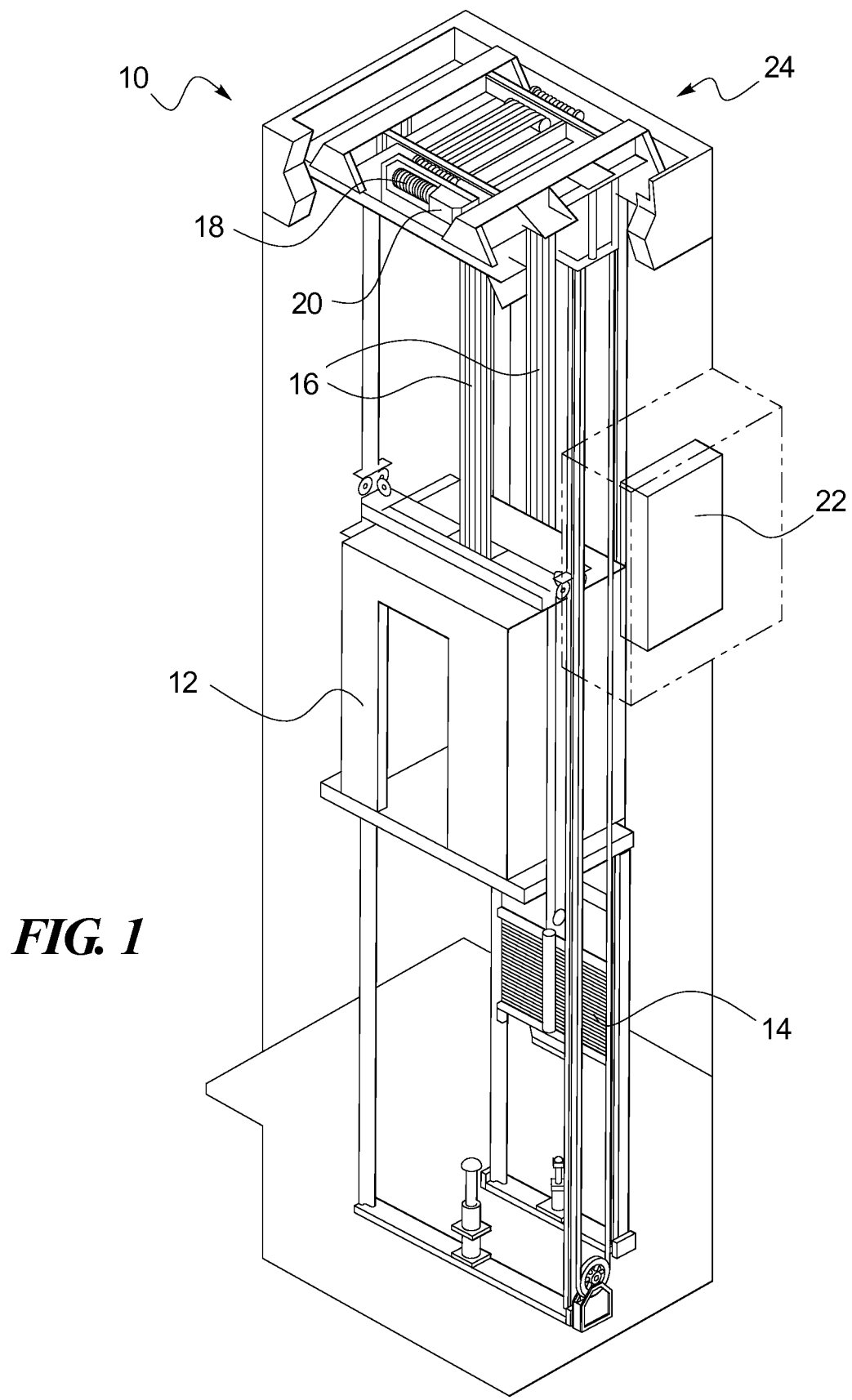
FIG. 1 is a partial perspective view of a typical elevator system.

While the present disclosure is susceptible to various modifications and alternative constructions, certain illustrative embodiments thereof have been shown in the drawings and will be described below in detail. It should be understood, however, that there is no intention to be limited to the specific forms disclosed, but on the contrary, the intention is to cover all modifications, alternative constructions, and equivalents falling with the spirit and scope of the present disclosure.

DETAILED DESCRIPTION

Referring now to FIG. 1, a schematic diagram of an exemplary elevator system 10 is provided. It is to be understood that the version of the elevator system 10 shown in FIG. 1 is for illustrative purposes only and to present background for some of the various components of a general elevator system. Other components of an elevator system unnecessary for an understanding of the present invention (e.g. safeties, guiderails, etc.) are not described.

As shown in FIG. 1, the elevator system 10 may include a cab 12 coupled to a counterweight 14 by one or more tension members 16. The tension members 16 may extend over a traction sheave 18 that is driven by a traction machine or motor 20. Traction between the sheave 18 and the tension members 16 may drive the cab 12 and counterweight 14 through the hoistway. Operation of the motor 20 may be controlled by a main controller 22. The elevator system 10 may further include a feedback system 24 disposed in a location proximate to the tension members 16, the traction sheave 18 and/or the motor 20 and configured to electronically provide feedback of the position and/or speed of the elevator cab 12 to the controller 22.

Figure 2:
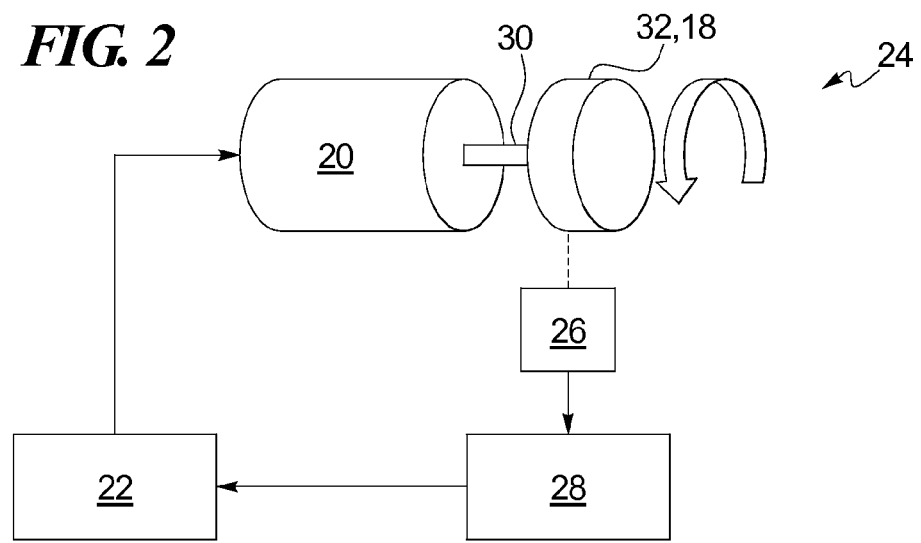
FIG. 2 is a schematic view of one exemplary embodiment of a feedback system constructed in accordance with the teachings of the present disclosure.

Turning to FIG. 2, an exemplary embodiment of a feedback system 24 having a sensor device 26 and an associated processing circuit 28 is provided. The associated elevator system 10 may be arranged such that the controller 22 is in electrical communication with the traction machine or motor 20, which is in further mechanical communication with one or more drive components 18, 32. More specifically, a drive signal provided by the controller 22 may cause the motor 20 to generate torque and rotate a driveshaft 30 rotatably coupled thereto. In turn, the driveshaft 30 may cause tension members 16, traction sheaves 18, rotors 32, and the like, to rotate at a predefined rate so as to lift or lower the elevator cab 12 to the appropriate levels within the hoistway. The sensor device 26 of the feedback system 24 may be disposed in proximity to one or more of the traction sheave 18 and the rotor 32 so as to detect displacement in the surfaces of the traction sheave 18 and/or the rotor 32. The sensor device 26 may then communicate a data signal corresponding to any detected displacement to the processing circuit 28 for further analysis.

Based on information contained within the data signal, the signal processing circuit 28 may be configured to generate a feedback signal to be communicated to the controller 22 of the elevator system 10. For example, based on the data signal provided by the sensor device 26 and predefined properties or mechanical relationships between the motor 20 and the drive components 18, 32, the processing circuit 28 may be able to calculate or determine the angular displacement and/or speed of the rotor 32 relative to the motor 20. From the angular displacement or speed of the rotor 32, the processing circuit 28 may further be able to determine the actual position or speed of the elevator cab 12 within the hoistway. The controller 22 may additionally employ information contained within the feedback signal to monitor for deviations in the actual output of the motor 20 and the observed position and/or speed of the elevator cab 12. For example, if the feedback signal indicates a deviation between an observed displacement in the elevator cab 12 and an expected displacement, the controller 12 may be configured to adjust the drive signal to the motor 20 to compensate for the deviations. Furthermore, if the detected deviations are substantial, the controller 22 may generate an alert indicating a potential fault condition. The processing circuit 28 may additionally provide filters, for example, a Kalman Filter, so as to minimize the effect of any electrical noise that may interfere with the signal processes.

Figure 3:
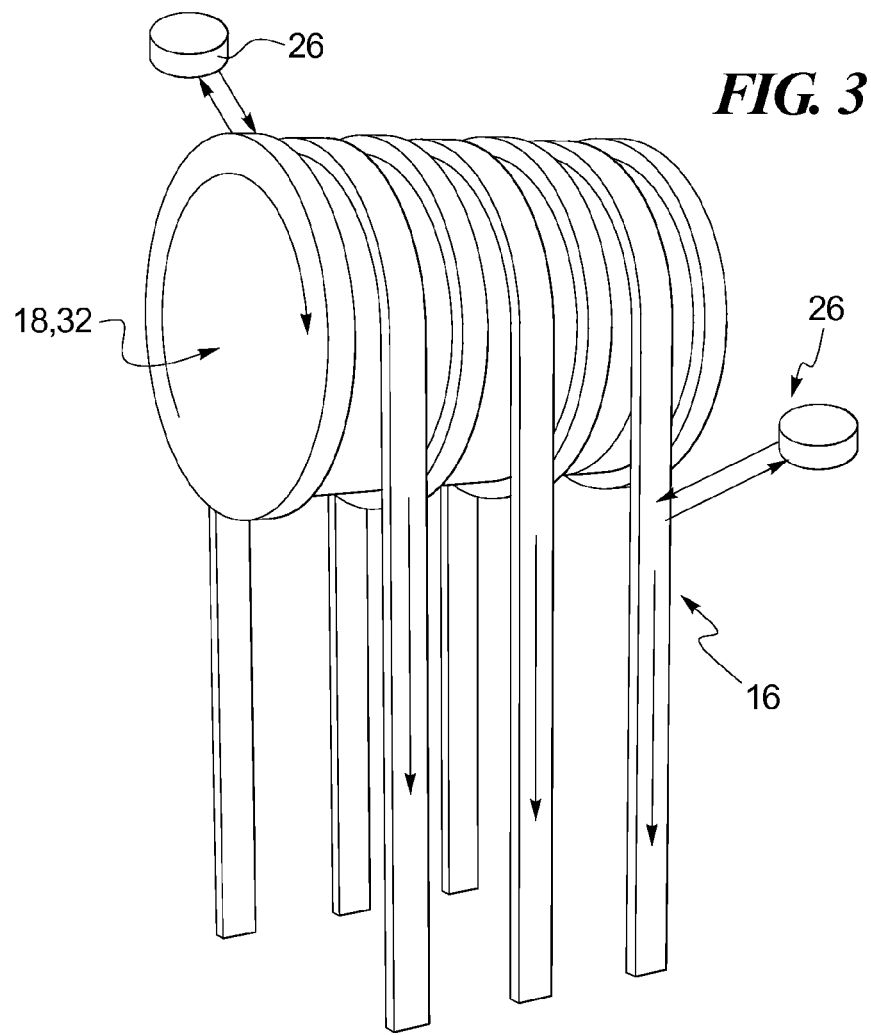
FIG. 3 is a schematic view of another configuration of sensor devices.

In a further modification, the feedback system 24 of FIG. 2 may additionally be configured to monitor a state of traction between two or more of the drive components 16, 18, 32. As shown in FIG. 3, for example, two sensor devices 26 may be configured such that one sensor device 26 is disposed in close proximity to the surface of the traction sheave 18 or rotor 32 while another sensor device 26 is disposed in close proximity to the surface of the tension member 16. Moreover, the sensor devices 26 may be configured to simultaneously monitor the movement of both the tension members 16 and the traction sheave 18 or rotor 32 for any discrepancies. Typical tension members 16 may include any combination of ropes, belts, cables, and the like, all of which may stretch or wear over time and cause a deterioration in traction or slip between the traction members 16 and the traction sheave 18. By comparing the movement of the tension members 16 with the traction sheave 18 or rotor 32, it may be possible to provide early detection of any significant loss in traction between the tension members 16 and the traction sheave 18.

Each of the sensor devices 26 of FIGS. 2 and 3 may be configured to detect movement in the surface patterns, gradations or irregularities of the drive components 16, 18, 32 during operation of the elevator system 10. The sensor devices 26 may generally include a transmitter for emitting a sensor signal onto a surface of a drive component 16, 18, 32 and a receiver for receiving any component of the sensor signal that is reflected back. Furthermore, the sensor devices 26 may detect movement in the surface of the drive components 16, 18, 32 based on frequency shift or image recognition techniques.

Using frequency shift techniques, the sensor device 26 may be able to differentiate between physical irregularities of a particular surface by tracking the different shifts in frequency which occur between the emitted reference sensor signals and the detected sensor signals reflecting off of those irregularities. By tracking the irregularities, the sensor device 26 may be able to determine the displacement or speed of the associated drive component 16, 18, 32. Accordingly, the sensor device 26 may be an optics based device configured to emit and receive sensor signals in the form of visible light from a light source such as a light emitting diode (LED), laser light, infrared light, and the like. The sensor device 26 may also employ sensor signals which may take the form of microwaves, ultrasonic waves, or any other suitable waveforms capable of frequency shift. The receiver of the sensor device 26 may employ a photodiode, photoresistor, or any other suitable detection device that produces a varied output in response to light.

Figure 4:
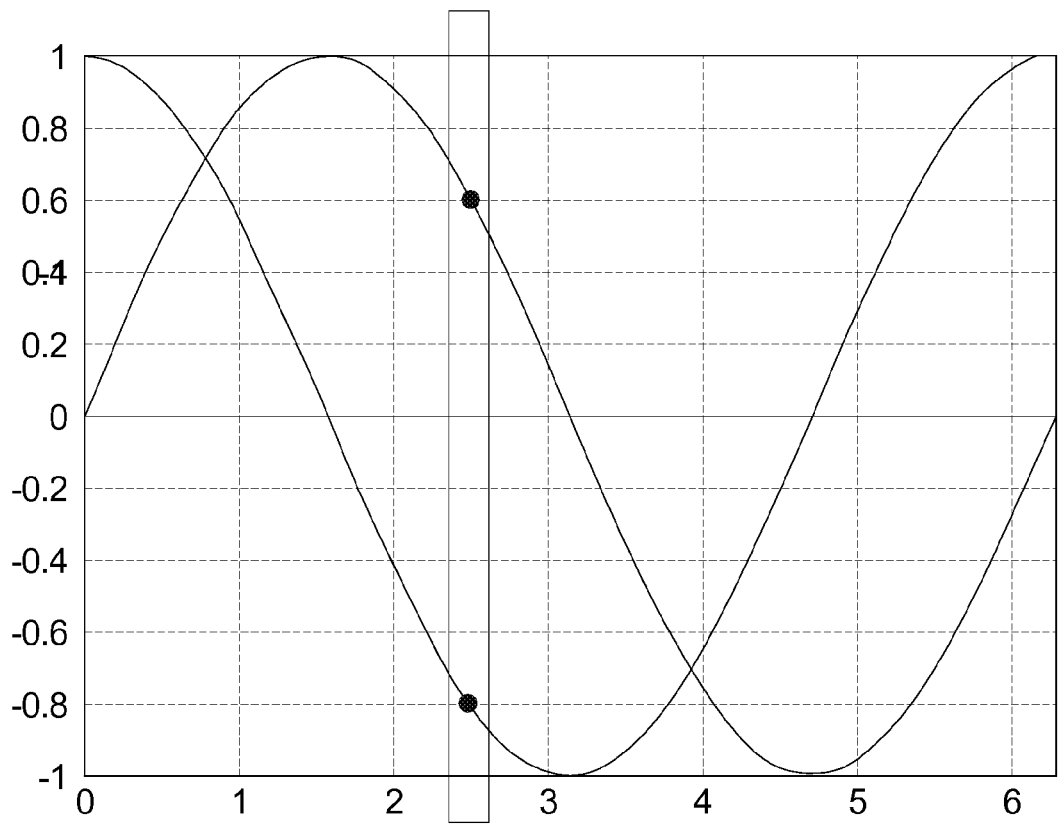
FIG. 4 is a graphical view of waveforms generated by yet another exemplary configuration of sensor devices.

Using image recognition techniques, the sensor device 26 may determine the displacement or speed of a drive component 16, 18, 32 based on specific markings or visually distinguishable gradations on the surface of the drive components. In such embodiments, the sensor device 26 may employ an imaging or speckle pattern motion sensing device, such as a complementary metal oxide semiconductor (CMOS) camera, or any other device capable of tracking surface features of the drive component 16, 18, 32. For example, the surface of the outer circumference of the traction sheave 18 of FIG. 3 may be visibly marked with sine, cosine and reference zero waveforms. Moreover, each waveform may be provided around the traction sheave 18 such that one full period of the waveform corresponds to one complete revolution of the traction sheave 18. Using a camera fixedly aimed at one section of the traction sheave 18, the sensor device 26 may be able to capture images of the waveforms as the traction sheave 18 rotates, as shown for example in FIG. 4.

By tracking waveforms, the sensor device 26 may be able to determine and track the rotational position, and thus, the displacement and speed of the traction sheave 18 or rotor 32. For example, if the sine value is determined to be 0.6 and the cosine value is determined to be −0.8, the corresponding rotational position of the traction sheave 18 may be derived using the inverse tangent or atan $$\left(\frac{0.6}{-0.8}\right).$$

From this, it may be determined that the resulting rotational position of the traction sheave 18 at that instance is approximately 2.5 radians or 143° from the origin. Similarly, in alternative embodiments, markings corresponding to only one sine or cosine waveform may be provided on the outer surface of the traction sheave 18, in which case the rotational position of the traction sheave 18 may be determined using the inverse sine or inverse cosine relationships, respectively. In further alternatives, other variations of the inverse tangent function, such as a two-argument inverse tangent function, may be used to derive the rotational position of the traction sheave 18 or rotor 32. In still further alternatives, other trigonometric functions, such as the inverse cotangent, inverse sine, inverse cosine, and the like, may be used.

Figure 5:
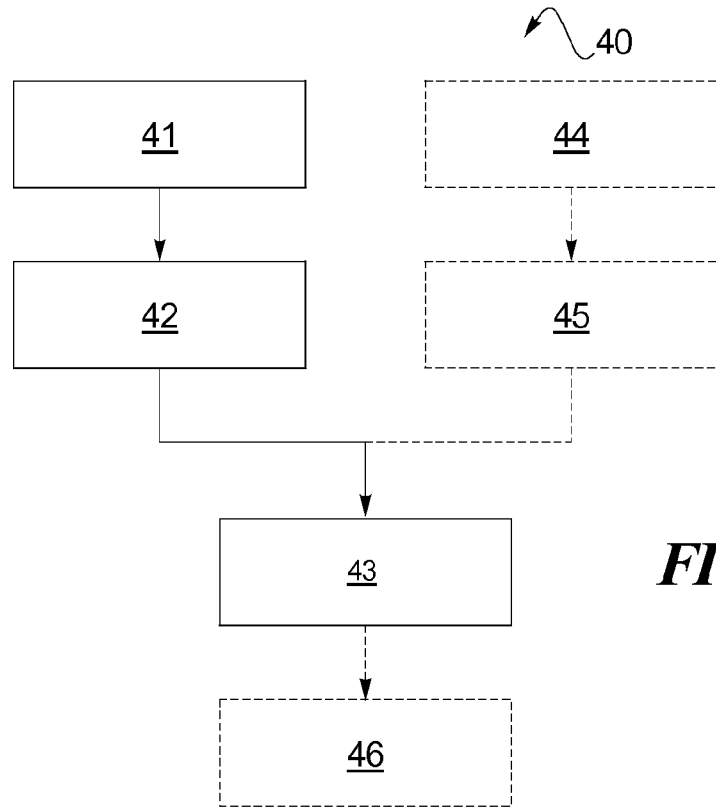
FIG. 5 is a diagrammatic view of a method for controlling an elevator system.

Turning now to FIG. 5, an exemplary method or algorithm 40 by which, for example, the processing circuit 28 may provide motor control to an elevator system 10 is schematically illustrated. Using a sensor device 26, the algorithm 40 may initially involve monitoring a surface of a drive component, such as a traction sheave 18, for displacement in step 41. Based on the sensor readings, the processing circuit 28 may be able to determine the rotational displacement and/or speed of the traction sheave 18 in step 42. During step 43, the processing circuit 28 may generally be configured to analyze the displacement and/or speed of the traction sheave 18 and to communicate the information as feedback to a controller 22. For example, in one particular implementation, the processing circuit 28 may determine or calculate the angular displacement and/or speed of the rotor 32 relative to the motor 20 based on the detected displacement of the traction sheave 18. Using the angular displacement and/or speed of the traction sheave 18 or rotor 32 and known mechanical relationships of the elevator system 10, the processing circuit 28 may additionally be configured to derive the position and/or speed of the elevator cab 12 within a hoistway. The controller 22 may refer to the feedback provided by the sensor device 26 to verify proper and consistent control of the elevator cab 12. If the feedback indicates an inconsistency, the controller 22 may adjust control of the motor 20 to compensate for the inconsistency. If the feedback indicates a fault condition, the controller 22 may safely halt operation and/or provide an alert so indicating.

Still referring to the method of FIG. 5, the method or algorithm 40 may additionally monitor a surface of a second drive component, such a as a tension member 16, for displacement using a second sensor device 26 in step 44. As in step 42, the processing circuit 28 may use the readings provided by the second sensor device 26 to determine the displacement and/or speed of the tension member 16 in step 45. Information corresponding to the tension member 16 may then optionally be combined with the information corresponding to the traction sheave 18 and/or rotor 32 for further processing. For example, the processing circuit 28 may use data provided by both sensor devices 26 to calculate the corresponding position and/or speed of the rotor 32 or elevator cab 12 and forward the information as feedback to the controller 22 in step 43. In an optional step 46, the processing circuit 28 may further determine a state of traction between, for example, one or more tension members 16 and the traction sheave 18, based on any observed discrepancies between the two sensor devices 26. In still further alternatives, each drive component 16, 18, 32 of the elevator system 10 may be provided with a sensor device 26 such that feedback is generated in response to three or more sensor readings.

Based on the foregoing, it can be seen that the present disclosure may provide a system and method for controlling an elevator system with minimal complexity and more cost-efficient implementations. Moreover, the sensor based feedback control systems disclosed may be used to effectively replace more costly encoders in elevator drive systems. The present disclosure may also be used to monitor the state of traction between drive components of an elevator system.

While only certain embodiments have been set forth, alternatives and modifications will be apparent from the above description to those skilled in the art. These and other alternatives are considered equivalents and within the spirit and scope of this disclosure.

What is claimed is:

1. A feedback system for a motor of an elevator system, comprising:
   a first sensor disposed in proximity to a drive component of the elevator system, the first sensor being configured to detect a change in position of the drive component; and
   a processing circuit configured to receive a first data signal from the first sensor corresponding to the change in position of the drive component and generate a feedback signal for controlling the motor based on the first data signal;
   wherein the processing circuit-is configured to receive a second data signal from a second sensor and generate the feedback signal based on the first and second data signals; and;
   wherein the first data signal corresponds to a change in position of a traction sheave and the second data signal corresponds to a change in position of a tension member, the processing circuit being configured to determine a state of traction between the tension member and the traction sheave based on any discrepancies between the first and second data signals.

2. The feedback system of claim 1, wherein the processing circuit is configured to determine at least one of an angular displacement and an angular speed of a rotor relative to the motor based on the first data signal.

3. The feedback system of claim 1, wherein the first sensor includes a transmitter for emitting a sensor signal and a receiver for receiving a reflection of the sensor signal, the emitted sensor signal having a predetermined frequency and communicated to the processing circuit as the first data signal.

4. The feedback system of claim 3, wherein the processing circuit is configured to detect any shift in frequency between the sensor signal emitted and the reflected sensor signal received by the first sensor, the processing circuit being configured to determine one or more of angular displacement and angular speed of a rotor relative to the motor based on the shift in frequency.

5. The feedback system of claim 1, wherein the first sensor is configured to detect the change in position of the drive component based on surface irregularities of the drive component.

6. The feedback system of claim 1, wherein the first sensor includes at least one of a laser source, a light-emitting diode (LED) source, an infrared light source, an ultrasonic wave source, and a microwave source.

7. The feedback system of claim 1, wherein the drive component includes at least one or more of a tension member, a traction sheave and a rotor rotatably coupled to the motor of the elevator system.

8. A feedback system for controlling a motor of an elevator system comprising:
   a first sensor disposed in proximity to a rotor rotatably coupled to the motor, the first sensor being configured to output a first data signal corresponding to a change in position of the rotor;
   a second sensor disposed in proximity to a tension member of the elevator system, the second sensor being configured to output a second data signal corresponding to a change in position of the tension member;
   a processing circuit configured to receive the first and second data signals from the first and second sensors, determine at least an angular displacement of the rotor relative to the motor based on the first and second data signals, and generate a feedback signal based on the angular displacement of the rotor; and
   a controller configured to receive the feedback signal and generate a drive signal for driving the motor based on the feedback signal;
   wherein the rotor is rigidly coupled to a traction sheave, the processing circuit being configured to determine a state of traction between the tension member and the traction sheave based on any discrepancies between the first and second data signals.

9. The feedback system of claim 8, wherein the processing circuit is configured to further determine one or more of position and speed of an elevator cab based on the speed of the rotor.

10. The feedback system of claim 8, wherein each of the first and second sensors includes a transmitter for emitting a sensor signal of a predetermined frequency and a receiver for receiving a reflection of the sensor signal, the sensor signals being reflected off of the rotor and the tension member.

11. The feedback system of claim 10, wherein the processing circuit is configured to detect any shifts in frequency in the reflected sensor signal for each of the first and second sensors, the processing circuit being configured to determine the angular speed of the rotor based on the shifts in frequency.

12. The feedback system of claim 8, wherein each of the first and second sensors includes at least one of a laser source, a light-emitting diode (LED) source, an infrared light source, an ultrasonic wave source, and a microwave source.

13. The feedback system of claim 8, wherein a surface of the rotor is provided with one or more markings and the first sensor includes a camera configured to visually capture at least a portion of the markings, the processing circuit being configured to determine a current angular displacement of the rotor based on a pattern of the markings that are captured by the camera.

14. A method for controlling a motor of an elevator system having an elevator cab, comprising the steps of:
- providing a first sensor in close proximity to a first drive component of the elevator system, the first sensor being configured to generate a first data signal in response to a change in position of the first drive component;
- determining at least a change in position of the elevator cab based on the change in position of the first drive component;
- generating a feedback signal for driving the motor of the elevator system, the feedback signal being based at least partially on the changes in position of the first drive component and the elevator cab;
- providing a second sensor in close proximity to a second drive component of the elevator system, the second sensor being configured to generate a second data signal in response to a change in position of the second drive component; and
- determining a state of traction between the first and second drive components based on any discrepancies between the first and second data signals.

15. The method of claim 14, wherein the first data signal corresponds to a frequency shift between an emitted sensor signal and a reflected sensor signal, the reflected sensor signal being reflected off of a surface of the first drive component.

16. The method of claim 14, wherein the first sensor includes at least one of a laser source, a light-emitting diode (LED) source, an infrared light source, an ultrasonic wave source, and a microwave source.

* * * * *